(12) United States Patent
Kropp

(10) Patent No.: US 8,729,197 B2
(45) Date of Patent: May 20, 2014

(54) EPOXY STRUCTURAL ADHESIVE

(75) Inventor: Michael A. Kropp, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/814,794

(22) PCT Filed: Jul. 19, 2011

(86) PCT No.: PCT/US2011/044414
§ 371 (c)(1),
(2), (4) Date: Feb. 7, 2013

(87) PCT Pub. No.: WO2012/021258
PCT Pub. Date: Feb. 16, 2012

(65) Prior Publication Data
US 2013/0137796 A1 May 30, 2013

Related U.S. Application Data

(60) Provisional application No. 61/372,304, filed on Aug. 10, 2010.

(51) Int. Cl.
*B65B 3/00* (2006.01)
*C08L 63/00* (2006.01)
*C08L 63/02* (2006.01)
*C08L 63/04* (2006.01)

(52) U.S. Cl.
USPC ............. 525/526; 141/285; 525/65; 525/113; 525/404; 525/438; 525/486

(58) Field of Classification Search
None
See application file for complete search history.

(56) References Cited

U.S. PATENT DOCUMENTS

| | | | |
|---|---|---|---|
| 4,240,566 A * | 12/1980 | Bergman | 222/135 |
| 5,021,537 A | 6/1991 | Stark et al. | |
| 5,134,216 A | 7/1992 | Jansen et al. | |
| 5,426,148 A | 6/1995 | Tucker | |
| 5,909,753 A * | 6/1999 | Rossi et al. | 141/330 |
| 6,677,426 B2 | 1/2004 | Noro et al. | |
| 7,459,515 B2 * | 12/2008 | Gommans et al. | 528/26 |
| 2002/0161162 A1 | 10/2002 | Kumar et al. | |
| 2004/0072927 A1 * | 4/2004 | Hachikian | 523/457 |
| 2006/0058451 A1 | 3/2006 | Gommans et al. | |
| 2011/0024039 A1 * | 2/2011 | Campbell et al. | 156/330 |
| 2011/0039108 A1 * | 2/2011 | Goeb et al. | 428/414 |
| 2011/0120646 A1 * | 5/2011 | Gorodisher et al. | 156/330 |
| 2012/0024477 A1 * | 2/2012 | Kropp | 156/330 |

FOREIGN PATENT DOCUMENTS

| | | |
|---|---|---|
| CA | 1339492 | 10/1997 |
| CN | 101348701 | 1/2009 |
| JP | 6256463 | 9/1994 |
| JP | 9291185 | 11/1997 |
| JP | 2001-151862 A * | 6/2001 |
| WO | WO 2008/089410 | 7/2008 |
| WO | WO 2010/011705 | 1/2010 |
| WO | WO 2010/011714 | 1/2010 |
| WO | WO 2010/039614 | 4/2010 |
| WO | WO 2010/091072 | 8/2010 |

OTHER PUBLICATIONS

PCT International Search Report for PCT/US2011/044414 dated Dec. 20, 2011, 4 pages.
Paul C. Hiemenz, Polymer Chemistry, The Basic Concepts, Marcel Dekker, 1984, 7 pages.

* cited by examiner

*Primary Examiner* — Robert Sellers
(74) *Attorney, Agent, or Firm* — Dena M. Ehrich

(57) ABSTRACT

Room temperature curing epoxy adhesives that show good adhesion to plastic substrates are described. The adhesives contain an epoxy resin component comprising a first epoxy resin and a second epoxy resin; a first amine curing agent having an equivalent weight of at least 50 grams per mole of amine equivalents; a second amine curing agent having an equivalent weight of no greater than 45 grams per mole of amine equivalents; an acetoacetoxy-functionalized compound; a metal salt catalyst; and a multifunctional acrylate.

20 Claims, No Drawings

EPOXY STRUCTURAL ADHESIVE

FIELD

The present disclosure relates to two-part epoxy structural adhesives, including low odor, fast reacting, two-part epoxy structural adhesives that show good adhesion to plastic substrates.

SUMMARY

Briefly, in one aspect, the present disclosure provides an adhesive comprising an epoxy resin component comprising a first epoxy resin and a second epoxy resin; a first amine curing agent having an equivalent weight of at least 50 grams per mole of amine equivalents; a second amine curing agent having an equivalent weight of no greater than 45 grams per mole of amine equivalents; an acetoacetoxy-functionalized compound; a metal salt catalyst; and a multifunctional acrylate.

In some embodiments, the first epoxy resin has the general formula of

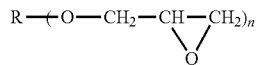

wherein, R comprises one or more aliphatic, cycloaliphatic, and/or aromatic hydrocarbon groups, optionally wherein R further comprises at least one ether linkage between adjacent hydrocarbon groups; and n is an integer greater than 1. In some embodiments, the first epoxy resin comprises a glycidyl ether of bisphenol-A, bisphenol-F, or novolac.

In some embodiments, the second epoxy resin is a polyurethane-modified epoxy resin. In some embodiments, the second epoxy resin is an isocyanate-modified epoxy resin. In some embodiments, the epoxy resin component comprises a third epoxy resin, wherein the third epoxy resin comprises at least one epoxy-based reactive diluent. In some embodiments, the third epoxy resin shows a high affinity for plastic substrates as determined by swelling or dissolution of the plastic substrate e.g., polycarbonate (PC) and/or acrylonitrile-butadiene—styrene (ABS), left in contact with the third epoxy resin for less than 6.5 hours.

In some embodiments, the equivalent weight of the first amine curing agent is at least 55 grams per mole of amine equivalents. In some embodiments, the equivalent weight of the second amine curing agent is no greater than 40 grams per mole of amine equivalents. In some embodiments, the relative amounts of low equivalent weight amine curing agent and high equivalent weight amine curing agent are selected such that the low equivalent weight amine curing agent composes at least 25 wt. % of the combined weight of the low and high equivalent weight amine curing agents, e.g., in some embodiments, the relative amounts of low equivalent weight amine curing agent and high equivalent weight amine curing agent are selected such that the low equivalent weight amine curing agent composes between 30 and 60 wt. %, inclusive, of the combined weight of the low and high equivalent weight amine curing agents.

In some embodiments, at least one amine curing agent, in some embodiments, both amine curing agents, have the formula

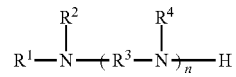

wherein, $R^1$, $R^2$, and $R^4$, are independently selected from hydrogen, a hydrocarbon containing 1 to 15 carbon atoms, and a polyether containing 1 to 15 carbon atoms; $R^3$ represents a hydrocarbon containing 1 to 15 carbon atoms or a polyether containing 1 to 15 carbon atoms; and n is from 2 to 10, inclusive.

In some embodiments, the acetoacetoxy-functionalized compound has the general formula:

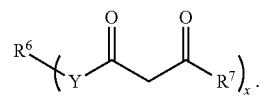

wherein, x is an integer from 1 to 10; Y represents O, S or NH; $R^6$ is selected from the group consisting of linear, branched and cyclic alkyl groups, aryl groups, alkylaryl groups, polyethers, polyesters, or combinations thereof; wherein R6 is linked to Y via a carbon atom; and R7 is a linear or branched or cyclic alkyl having 1 to 12 carbon atoms. In some embodiments, the multifunctional acrylate and the acetoacetoxy-functionalized compound together comprise at least 11 wt. % of the adhesive. In some embodiments, the ratio of the multifunctional acrylate to the acetoacetoxy-functionalized compound ranges from 80 parts by weight multifunctional acrylate:20 parts by weight acetoacetoxy-functionalized compound to 20 parts by weight multifunctional acrylate:80 parts by weight acetoacetoxy-functionalized compound.

In some embodiments, the metal salt catalyst comprises calcium triflate. In some embodiments, the adhesive comprises 0.3 to 1.5 wt. % catalyst, based on the total weight of the composition.

In some embodiments, the adhesive further comprises a toughening agent; e.g., a core/shell polymer and/or a butadiene-nitrile rubber. In some embodiments, the adhesive further comprises an aromatic tertiary amine.

In some aspects of the present disclosure, the adhesive comprises two components. The first component comprises the acetoacetoxy-functionalized compound, the multifunctional acrylate, and at least a portion of the epoxy resin component, and the second component comprises the first amine curing agent, the second amine curing agent, and the metal salt catalyst. In some embodiments, the second component further comprises a portion of the epoxy resin component. In some embodiments the first component further comprises at least one epoxy diluent.

In some embodiments, the adhesive comprises at least 16 wt. % of acetoacetoxy-functionalized compound based on the total weight of the first component.

In some embodiments, the adhesive has a gel time at 25° C. of no greater than 20 minutes as measured according to the Gel Time Test Method. In some embodiments, when cured at 23° C., the adhesive has an over-lap shear value of at least 0.34 MPa after no greater than 30 minutes, according to the Rate of Strength Buildup Test Method.

In another aspect, the present disclosure provides an adhesive dispenser comprising a first chamber containing a first component of a two-part adhesive, a second chamber containing a second component of the two-part adhesive, and a mixing tip, wherein the first and second chambers are coupled to the mixing tip to allow the first component and the second component to flow through the mixing tip. The first component comprises an epoxy resin, a polyurethane-modified or isocyanate-modified epoxy resin, a multifunctional acrylate, and an acetoacetoxy-functionalized compound, and, in some embodiments, the first component further comprises at least one epoxy diluent. The second component comprises a first amine curing agent having an equivalent weight of at least 50 grams per mole of amine equivalents; a second amine curing agent having an equivalent weight of no greater than 45 grams per mole of amine equivalents; and a metal salt catalyst. In some embodiments, at least one of the first or second components further comprises a toughening agent; e.g. a core/shell polymer and/or a butadiene-nitrile rubber.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Structural adhesives are useful in many bonding applications. For example, structural adhesives may be used to replace or augment conventional joining techniques such as welding or the use of mechanical fasteners such as nuts and bolts, screws, rivets, and the like.

Generally, structural adhesives may be divided into two broad categories: one-part adhesives and two-part adhesives. With a one-part adhesive, a single composition comprises all the materials necessary to obtain a final cured adhesive. Such adhesives are typically applied to the substrates to be bonded and exposed to elevated temperatures (e.g., temperatures greater than 50° C.) to cure the adhesive.

In contrast, two-part adhesives comprise two components. The first component, typically referred to as the "base resin component," comprises the curable resin, e.g., a curable epoxy resin. The second component, typically referred to as the "accelerator component," comprises the curing agent(s) and catalysts. Various other additives may be included in one or both components.

Generally, the two components of a two-part adhesive are mixed prior to being applied to the substrates to be bonded. After mixing, the two-part adhesive gels, reaches a desired handling strength, and ultimately achieves a desired final strength. Some two-part adhesives must be exposed to elevated temperatures to cure, or at least to cure within a desired time. However, it may be desirable to provide structural adhesives that do not require heat to cure (e.g., room temperature curable adhesives), yet still provide high performance in peel, shear, and impact resistance.

As used herein, "gel time" refers to the time required for the mixed components to reach the gel point. As used herein, the "gel point" is the point where the mixture's storage modulus exceeds its loss modulus.

"Handling strength" refers to the ability of the adhesive to cure to the point where the bonded parts can be handled in subsequent operations without destroying the bond. The required handling strength varies by application. As used herein, "initial cure time" refers to the time required for the mixed components to reach an overlap shear adhesion of 0.34 MPa (50 psi); which is a typical handling strength target. Generally, the initial cure time correlates with the gel time; i.e., shorter gel times typically indicate adhesives with shorter initial cure times.

Generally, the bond strength (e.g., peel strength, overlap shear strength, or impact strength) of a structural adhesive continues to build well after the initial cure time. For example, it may take hours or even days for the adhesive to reach its ultimate strength.

Exemplary two-part structural adhesives include those based on acrylic, polyurethane, and epoxy chemistries. Epoxy-based, two-part structural adhesives typically offer high performance in peel strength and shear strength, even at elevated temperatures. Common curatives are typically amine- or mercapto-functional materials, and many variations of these compounds are available for epoxy curing. However, most amine-cured room temperature curing epoxy-based adhesives are relatively slow curing and can take several hours to reach handling strength. Catalysts, typically tertiary amines, phenol functional resins, and some metal salts can accelerate these cures. Still, the initial cure time at room temperature for epoxy adhesives is typically much longer than the initial cure time for acrylic adhesives.

Another difficulty with epoxy resins is their limited adhesion to certain substrates, particularly plastic substrates. Typically plastics are bonded using acrylic adhesives, but acrylics can have a strong odor, and the cure is inhibited by oxygen, which leads to inhibited cure on porous substrates.

There remains a need for an epoxy adhesive that cures rapidly and provides high adhesive strength to engineering thermoplastics. In some embodiments, the present disclosure provides fast curing, room temperature curable, two-part epoxy adhesives. In some embodiments, such adhesives can provide rapid handling strength while maintaining excellent adhesion properties to plastics. In some embodiments, these adhesives provide room temperature gel times and handling strength times of less than 30 minutes in adhesive bond thicknesses of up to 0.5 millimeters (20 mils). In some embodiments, the adhesive is low odor, and is free of mercaptan functionality, which can be desirable in certain applications.

Generally, the adhesives of the present disclosure comprise an epoxy resin component, a high equivalent weight amine curing agent, a low equivalent weight amine curing agent, an acetoacetoxy-functionalized compound, a metal salt catalyst, and a multifunctional acrylate. The epoxy resin component comprises a first epoxy resin and a second epoxy resin, wherein the second epoxy resin is a polyurethane-modified or isocyanate-modified epoxy resin. In some embodiments, the epoxy resin component may comprise additional epoxy resins. In some embodiments, the epoxy resin component further comprises a third epoxy resin, wherein the third epoxy resin comprises at least one epoxy-based reactive diluent.

First Epoxy Resins. Exemplary epoxy resins that are useful as first epoxy resins in the compositions of the present disclosure are of the glycidyl ether type. Useful resins include those having the general Formula (I):

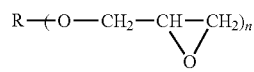

wherein

R comprises one or more aliphatic, cycloaliphatic, and/or aromatic hydrocarbon groups, optionally wherein R further comprises at least one ether linkage between adjacent hydrocarbon groups; and n is an integer greater than 1.

Generally, n is the number of glycidyl ether groups and must be greater than 1 for at least one of the first epoxy resins of Formula I present in the adhesive. In some embodiments, n is 2 to 4, inclusive.

Exemplary first epoxy resins include glycidyl ethers of bisphenol A, bisphenol F, and novolac resins as well as glycidyl ethers of aliphatic or cycloaliphatic diols. Examples of commercially available glycidyl ethers include diglycidylethers of bisphenol A (e.g. those available under the trade names EPON 828, EPON 1001, EPON 1310 and EPON 1510 from Hexion Specialty Chemicals GmbH, Rosbach, Germany, those available under the trade name D.E.R. from Dow Chemical Co. (e.g., D.E.R. 331, 332, and 334), those available under the trade name EPICLON from Dainippon Ink and Chemicals, Inc. (e.g., EPICLON 840 and 850) and those available under the trade name YL-980 from Japan Epoxy Resins Co., Ltd.); diglycidyl ethers of bisphenol F (e.g. those available under the trade name EPICLON from Dainippon Ink and Chemicals, Inc. (e.g., EPICLON 830)); polyglycidyl ethers of novolac resins (e.g., novolac epoxy resins, such as those available under the trade name D.E.N. from Dow Chemical Co. (e.g., D.E.N. 425, 431, and 438)); and flame retardant epoxy resins (e.g., D.E.R. 580, a brominated bisphenol type epoxy resin available from Dow Chemical Co.). In some embodiments, aromatic glycidyl ethers, such as those prepared by reacting a dihydric phenol with an excess of epichlorohydrin, may be preferred.

In some embodiments, the first epoxy resin has a molecular weight of at least 170, e.g., at least 200 g/mole. In some embodiments, the first epoxy resin has a molecular weight of no greater than 10,000, e.g., no greater than 3,000 g/mol. In some embodiments, the epoxy equivalent weight of the first epoxy resin is at least 50, in some embodiments, at least 100 g/mole of epoxy equivalents. In some embodiments, the epoxy equivalent weight of the first epoxy resin is no greater than 500, in some embodiments, no greater than 400 g/mole of epoxy equivalents As used herein, the phrase "total weight of the composition" refers to the combined weight of both components, i.e., the base resin component and the accelerator component.

Second epoxy resins. Generally, the second epoxy resin is selected from the group consisting of Polyurethane-Modified Epoxy Resins, Isocyanate-Modified Epoxy Resins, and combinations thereof. Isocyanate modified epoxy resins can have oxazolidine functionality if the isocyanate reacts directly with the epoxy, or ureido functionality if the isocyanate reacts with secondary hydroxyl groups present in the epoxy molecule. Examples of isocyanate- or polyurethane-modified epoxy resins useful as second epoxy resins in the compositions of the present disclosure include those available under the trade names, EPU-17T-6, EPU-78-11, and EPU-1761, available from Adeka Co., those under the trade name, DER 6508, from Dow Chemical Co., and those under the trade name, AER 4152, available from Asahi Denka. The present inventors have discovered that, within the compositions of the present disclosure, polyurethane- and/or isocyanate-modified epoxies generally improve adhesion to plastics such as ABS and polyvinyl chloride (PVC).

Generally, the epoxy resin component may comprise additional epoxy resins, including, but not limited to, two or more first epoxy resins and/or two or more second epoxy resins. In some embodiments, the epoxy resins component comprises a third epoxy resin, wherein the third epoxy resin comprises at least one epoxy-based reactive diluent.

Epoxy-based Reactive Diluent. Epoxy-based reactive diluents, including mono-epoxy compounds and di/poly-functional epoxy compounds, may be added to, e.g., reduce viscosity and improve wetting. The presence of the epoxide group(s) allows the reactive diluent to participate, with the other epoxy resin components and curing agents, in polymerization and crosslinking, thus allowing the diluent to be co- reacted into the resultant crosslinked network. Suitable diluents can have at least one reactive terminal end portion and, preferably, a saturated or unsaturated cyclic backbone. Exemplary reactive terminal ether portions include glycidyl ether. Commercially available epoxy-based reactive diluents useful in the present disclosure as third epoxy resins include purified p-t-butyl glycidylphenol (available under the trade name, EP 509S, from Adeka, Co.), 1,4-butanediol diglycidyl ether (available under the trade name, ERISYS GE21, from CVC; and available under the trade name, RD-2, from Ciba Product Corp.), hexanediol diglycidyl ether (available under the trade name, YED 216, from Japan Epoxy Resins, Ltd.), divinylbenzene dioxide, allocimene dioxide, monovinyl cyclohexane oxide, epoxypentyl ethers, epoxidized cyclohexenyl compounds, limonene diepoxide, bis(2,3-epoxy-2-methyl propyl)ether, 2,3-epoxy-2-methyl propyl ethers of alkylene glycols, 1,2-bis(epoxyalkyl)cyclobutanes, glycidyl glycidate, 3,4-epoxyhexahydrobenzyl glycidyl ether, glycidyl ethers of $C_7$ to $C_9$ alcohols, oxymethyl-1,3-diozalane glycidyl ether, allyl glycidyl ether, butyl glycidyl ether, phenyl glycidyl ether, styrene oxide, and octylene oxide.

In some embodiments, the epoxy-based reactive diluent shows a high affinity for one or more plastic substrates as determined by swelling or dissolution of the plastic substrate left in contact with the epoxy-based reactive diluent for 6.5 hours or less. In some embodiments, the epoxy-based reactive diluent shows a high affinity for one or more plastic substrates as determined by swelling or dissolution of the plastic substrate left in contact with the epoxy-based reactive diluent for an amount of time between about 5 hours and about 6.5 hours. Exemplary plastic substrates include PC, ABS, polyamides, polyesters, polyurethanes and/or combinations thereof. In some embodiments, the addition of the epoxy-based reactive diluent may improve the bond strength of the adhesive to certain plastic substrates.

In some embodiments, the compositions of the present disclosure comprise at least 20 wt. %, e.g., at least 25 wt. %, or even at least 30 wt. % of the epoxy resin component, based on the total weight of the composition. In some embodiments, the compositions of the present disclosure comprise no greater than 90 wt. %, e.g., no greater than 75 wt. %, or even no greater than 60 wt. % of the epoxy component resin, based on the total weight of the composition.

Amine Curing Agents. Suitable curing agents are compounds which are capable of cross-linking the epoxy resin. Typically, these agents are primary and/or secondary amines. The amines may be aliphatic, cycloaliphatic, or aromatic. In some embodiments, useful amine curing agents include those having the general Formula (II)

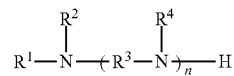

wherein
$R^1$, $R^2$, and $R^4$, are independently selected from hydrogen, a hydrocarbon containing 1 to 15 carbon atoms, and a polyether containing up to 15 carbon atoms;
$R^3$ represents a hydrocarbon containing 1 to 15 carbon atoms or a polyether containing up to 15 carbon atoms; and
n is from 2 to 10, inclusive.

The adhesives of the present disclosure comprise at least two amine curing agents. One amine curing agent is a low equivalent weight amine curing agent, i.e., an amine curing agent having an amine equivalent weight of no greater than 45 grams per mole of amine equivalents. In some embodiments, the low equivalent weight amine curing agent has an amine equivalent weight of no greater than 40, or even no greater than 35 grams per mole of amine equivalents. In some embodiments, two or more low equivalent weight amine curing agents may be used.

The second amine curing agent is a high equivalent weight amine curing agent, i.e., an amine curing agent having an amine equivalent weight of at least 50 grams per mole of equivalents. In some embodiments, the high equivalent weight amine curing agent has an amine equivalent weight of at least 55 grams per mole of amine equivalents. In some embodiments, two or more high equivalent weight amine curing agents may be used.

Exemplary amine curing agents include ethylene amine, ethylene diamine, diethylene diamine, propylene diamine, hexamethylene diamine, 2-methyl-1,5-pentamethylene-diamine, triethylene tetramine, tetraethylene pentamine ("TEPA"), hexaethylene heptamine, and the like. Commercially available amine curing agents include those available from Air Products and Chemicals, Inc. under the trade name ANCAMINE.

In some embodiments, at least one of the amine curing agents is a polyether amine having one or more amine moieties, including those polyether amines that can be derived from polypropylene oxide or polyethylene oxide. Suitable polyether amines that can be used include those available from Huntsman under the trade name JEFFAMINE, and from Air Products and Chemicals, Inc. under the trade name ANCAMINE.

In some embodiments, the relative amounts of the low and high equivalent weight amine curing agents are selected such that the low equivalent weight amine curing agent(s) compose at least 25 wt. %, in some embodiments, at least 30 wt. %, at least 40 wt. %, or even at least 50 wt. %, of the combined weight of the low and high equivalent weight amine curing agents. In some embodiments, the low equivalent weight amine curing agent(s) compose between 30 and 70 wt. %, in some embodiments, between 30 and 60 wt. %, or even between 30 and 50 wt. % of the combined weight of the low and high equivalent weight amine curing agents.

Unless otherwise indicated, all ranges expressed herein are inclusive, i.e., all ranges include the end points of the range. Thus, for example, a range of 30 to 70 wt. % includes 30 wt. %, 70 wt. % and all values in between (e.g., 30.1 wt. %, 40 wt. %, and 69.9 wt. %).

Acetoacetoxy-functionalized compound. The acetoacetoxy-functionalized compound is a material comprising at least one acetoacetoxy group, preferably in a terminal position. Such compounds include acetoacetoxy group(s) bearing hydrocarbons, such as linear, branched and cyclic alkyl groups, aryl groups, alkylaryl groups, as well as polyethers, polyesters, or combinations thereof.

Generally, the acetoacetoxy-functionalized compound is a monomer or relatively low molecular weight oligomer. In some embodiments, the oligomer comprises no greater than 20 repeat units, in some embodiments, no greater than 10, or even no greater than 5 repeat units. In some embodiments, the acetoacetoxy-functionalized oligomer has a molecular weight of no greater than 10,000 g/mol, e.g., no greater than 4,000, no greater than 3000, or even no greater than 1000 g/mol. In some embodiments, the acetoacetoxy-functionalized compound has a molecular weight of at least 100 g/mol, e.g., at least 150, or even at least 200 g/mol.

In some embodiments, the acetoacetoxy-functionalized compound has the general Formula (III):

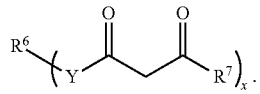

In Formula (III)
x is an integer from 1 to 10 (e.g., an integer from 1 to 3);
Y represents O, S or NH; and
R7 is a linear or branched or cyclic alkyl having 1 to 12 carbon atoms (e.g., methyl, ethyl, propyl, butyl, sec-butyl, tert-butyl, and the like).

In Formula (III), R6 is selected from the group consisting of polyoxy groups, polyester-alkyls, -aryls, and -alkylaryls, and linear, branched, saturated, and unsaturated alkyl-, aryl-, and alkylaryl-groups; wherein R6 is linked to Y via a carbon atom.

Generally, R6 may be linear or branched. In some embodiments, R6 comprises from 2 to 20 carbon atoms, e.g., from 2 to 10 carbon atoms. In some embodiments, R6 may contain from 2 to 20 oxygen atoms, e.g., from 2 to 10 oxygen atoms.

Acetoacetoxy-functionalized compounds are commercially available, for example, as K-FLEX XM-B301 from King Industries.

The compositions of the present disclosure comprise at least 16 wt. % acetoacetoxy-functionalized compound, based on the total weight of the composition. In some embodiments, the composition comprises at least 17 wt. %, or even at least 18 wt. % acetoacetoxy-functionalized compound, based on the total weight of the composition. In some embodiments, the composition comprises no greater than 30 wt. %, e.g., no greater than 25 wt. %, or even no greater than 20 wt. % acetoacetoxy-functionalized compound, based on the total weight of the composition.

Metal Salt Catalyst. Suitable metal salt catalysts include the group I metal, group II metal, and lanthanoid salts. In some embodiments, the group I metal cation is lithium. In some embodiments, the group II metal cation is calcium or magnesium. Generally, the anion is selected from nitrates, iodides, thiocyanates, triflates, alkoxides, perchlorates, and sulfonates, including their hydrates. In some embodiments, the anion is a nitrate or a triflate. In some embodiments, the metal salt catalyst may be selected from the group consisting of lanthanum nitrate, lanthanum triflate, lithium iodide, lithium nitrate, calcium nitrate, calcium triflate, and their corresponding hydrates.

In general, a catalytic amount of salt is employed. In some embodiments, the composition will comprise at least 0.1, e.g., at least 0.5, or even at least 0.8 wt. % catalyst based on the total weight of the composition. In some embodiments, the composition will comprise no greater than 2 wt. %, e.g., no greater than 1.5 wt. %, or even no greater than 1.1 wt. % catalyst based on the total weight of the composition In some embodiments, the composition comprises 0.2 to 2 wt. %, e.g., 0.3 to 1.5 wt. %, or even 0.8 to 1.1 wt. % catalyst based on the total weight of the composition.

Multifunctional Acrylates. Multifunctional acrylates include compounds comprising two or more acrylate functional groups. The acrylates will react with amines in the accelerator component of a two-part epoxy system via the Michael reaction, which is a more rapid reaction than that of the epoxy with the amine. Exemplary multifunctional acrylates useful for shortening the gel time include hexanediol diacrylate; pentaerythritol pentaacrylate; blends of multifunctional acrylic resins available under the trade name M-CURE, from Sartomer; and trimethylol propane triacrylate (TMPTA), available, in various levels blended with bisphenol A epoxy resins, under the trade name, EPON 8111, from Hexion.

In some embodiments, the multifunctional acrylate and the acetoacetoxy-functionalized compound together comprise at least 11 wt. % of the adhesive. In some embodiments, the ratio of the multifunctional acrylate to the acetoacetoxy-functionalized compound ranges from 80 parts by weight multifunctional acrylate:20 parts by weight acetoacetoxy-functionalized compound to 20 parts by weight multifunctional acrylate:80 parts by weight acetoacetoxy-functionalized compound.

In some embodiments, the adhesive compositions of the present disclosure can be used in bonding applications that require fast cure times and good adhesion to plastic substrates such as PC, ABS, polyamides, polyesters, polyurethanes, and combinations thereof.

The adhesive compositions of the present disclosure may contain any of a wide variety of additional, optional, components. Exemplary, non-limiting, optional additives include the following.

Toughening agents. Toughening agents are polymers capable of increasing the toughness of cured epoxy resins. The toughness can be measured by the peel strength of the cured compositions. Typical toughening agents include core/shell polymers, butadiene-nitrile rubbers, and acrylic polymers and copolymers.

In some embodiments, the toughening agent is a core/shell polymer. In some embodiments, the core may be an elastomer, e.g., an elastomer having a glass transition temperature lower than 0° C. In some embodiments, the core comprises a butadiene polymer or copolymer (e.g., a butadiene-styrene copolymer), an acrylonitrile polymer or copolymer, an acrylate polymer or copolymer, or combinations thereof. In some embodiments, the polymers or copolymers of the core may be cross-linked.

Generally, the shell comprises one or more polymers grafted on to the core. In some embodiments, the shell polymer has a high glass transition temperature, i.e. a glass transition temperature greater than 26° C. The glass transition temperature may be determined by dynamic mechanical thermo analysis (DMTA) ("Polymer Chemistry, The Basic Concepts, Paul C. Hiemenz, Marcel Dekker 1984).

Exemplary core/shell polymers and their preparation are described in, e.g., U.S. Pat. No. 4,778,851. Commercially available core/shell polymers include, e.g., PARALOID EXL 2600 from Rohm & Haas Company, Philadelphia, USA, and KANE ACE MX120 from Kaneka, Belgium.

In some embodiments, the core/shell polymer has an average particle size of at least 10 nm, e.g., at least 150 nm. In some embodiments, the core/shell polymer has an average particle size of no greater than 1,000 nm, e.g., no greater than 500 nm.

In some embodiments, the core/shell polymer may be present in an amount of at least 5 wt. %., e.g., at least 7 wt. %, based on the weight of the total composition. In some embodiments, the core/shell polymer may be present in an amount no greater than 50 wt. %, e.g., no greater than 30 wt. %, e.g., no greater than 15 wt. %, based on the weight of the total composition.

In some embodiments, the composition may also comprise a secondary catalyst. Exemplary secondary catalysts include imidazoles, imidazole-salts, and imidazolines. Aromatic tertiary amines may also be used as secondary curatives, including those having the structure of Formula (IV):

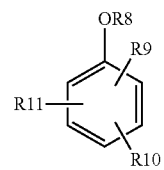

wherein; R8 is H or an alkyl group; R9, R10, and R11 are, independently, hydrogen or CHNR12R13, wherein at least one of R9, R10, and R11 is CHNR12R13; and R12 and R13 are, independently, alkyl groups. In some embodiments, the alkyl groups of R8, R12, and/or R13 are methyl or ethyl groups. One, exemplary secondary curative is tris-2,4,6-(dimethylaminomethyl)phenol, commercially available as ANCAMINE K54 from Air Products Chemicals.

Other additives may include adhesion promoters, corrosion inhibitors and rheology controlling agents. Exemplary additives include silica-gels, calcium silicates, phosphates, molybdates, fumed silica, clays such as bentonite or wollastonite, organo-clays, aluminium-trihydrates, hollow-glass-microspheres; hollow-polymeric microspheres, silane coupling agents, and calcium-carbonate.

Pigments may include inorganic or organic pigments including ferric oxide, brick dust, carbon black, titanium oxide and the like.

EXAMPLES

Test Methods

Gel Time Test Method. Gel times were measured at 25° C. with an ARES LS2 rheometer (TA Instruments), using a parallel plate configuration with 25 mm diameter plates and a 0.5 mm gap. Measurements were made in dynamic mode at 1 Hz, starting at 5% strain. The autotension and autostrain settings were used to control the gap and torque during the measurement. After applying samples directly to the bottom plate, the gap was set and the test was started within 30 seconds. The time to reach the crossover point, i.e., the point where the storage modulus (G') value became greater than the loss modulus (G") value, was reported as the gel time.

Overlap Shear Adhesion Test Method. Test panels measuring 2.5 cm wide by 10.2 cm long (1 inch by 4 inches) of several different materials were used to evaluate overlap shear adhesion. The bonding surfaces of the panels were cleaned by lightly abrading them using a 3M SCOTCH-BRITE No. 86 scouring pad (green colored), followed by an isopropyl alcohol wipe to remove any loose debris. A bead of adhesive was then dispensed along one end of a test panel, about 6.4 mm (0.25 inch) from the end. The panels were joined together face to face along their length to provide an overlap bond area measuring approximately 1.3 cm long and 2.5 cm wide (0.5 inch by 1 inch). A uniform bond line thickness was provided by sprinkling a small amount of 0.2 mm (0.008 inch) diameter solid glass beads on the adhesive before joining the two test panels together. The bonded test panel samples were allowed to dwell at 23° C. (room temperature) for at least 48 hours to ensure full cure of the adhesive. The samples were tested at 22° C. for peak overlap shear strength at a separation rate of 2.5 mm/minute (0.1 inch/minute). The reported values represent the average of three samples.

Rate of Strength Buildup Test Method. Six aluminum test panels measuring 10.2 cm long by 2.5 cm wide by 1.6 mm thick ((4 inches by 1 inch by 0.063 inch) were cleaned and bonded as described above in the Overlap Shear Adhesion Test Method with the following modification. Spacer beads having a diameter of between 0.08 and 0.13 mm (0.003 and 0.005 inches) were used to control the bond line thickness. The bonded test panels were held at room temperature (23° C.) and evaluated for overlap shear strength at periodic intervals from the time the bonds were made.

Materials. The inventive compositions are comprised of a first epoxy resin (component a1) and a second epoxy resin (component a2); a first amine curing agent having an equivalent weight of at least 50 grams per mole of amine equivalents (component b); a second amine curing agent having an equivalent weight of no greater than 45 grams per mole of amine equivalents (component c); an acetoacetoxy-functionalized compound (component d); a metal salt catalyst (component e); and a multifunctional acrylate (component f). Some embodiments of the inventive compositions may also comprise a third epoxy resin (component a3), wherein the third epoxy resin comprises at least one epoxy-based reactive diluent. Some compositions may also comprise other additives (component other). The materials used in the examples as components a1-other are summarized in Table 1.

TABLE 1

Materials.

| Component | Material | Description | Source |
|---|---|---|---|
| a1 | KANE-ACE MX-257 ("MX-257") | 37 wt. % core/shell rubber dispersed in bisphenol A epoxy | Kaneka Texas Corp |
|  | KANE-ACE MX-267 ("MX-267") | 37 wt. % core/shell rubber dispersed in bisphenol F epoxy | Kaneka Texas Corp |
|  | YL 980 | bisphenol A epoxy (average ew = 186), electronic grade | Japan Epoxy Resins, Ltd. |
|  | EPON 834 | bisphenol A epoxy (average ew = 255) | Hexion, Columbus, OH |
|  | EPON 828 | bisphenol A epoxy (average ew = 189) | Hexion, Columbus, OH |
| a2 | AER 4152 | isocyanate modified epoxy | Asahi Kasai Chemicals, Tokyo, Japan |
| a3 | EP 509S | p-t-butyl glycidylphenol, distilled grade | Adeka, Tokyo, Japan |
|  | ERISYS GE21 | 1,4 butanediol diglycidyl ether | CVC Chemical, Moorestown, NJ |
| b | ANCAMINE 1922A | diethylene glycol di(aminopropyl) ether (average ew = 55) | Air Products, Allentown, PA |
| c | ANCAMINE 2678 | proprietary diamine (average ew = 30) | Air Products, Allentown, PA |
| d | XM B301 | acetoacetate ("AcAc") functional reactive diluent (average ew = 190) | King Industries, Norwalk, CT |
| e | CaOTf | calcium trifluoromethanesulfonate (i.e., calcium triflate) | 3M Co., St Paul, MN |
| f | MCURE 201 | proprietary blend of multifunctional acrylates (average ew = 100) | Sartomer, Exton, PA |
|  | MCURE 300 | proprietary blend of multifunctional acrylates (average ew = 116) | Sartomer, Exton, PA |
| Other | Z-6040 | glycidoxy propyltrimethoxy silane | Dow Corning Co., Midland, MI |
|  | ASP 600 | hydrous aluminosilicate | BASF, Ludwigshafen, DE |
|  | SYLOTHIX 52 | polyethylene/silica fibers | EP Minerals, Reno, NV |
|  | MINEX 7, 4, or 10 | alumina silicate | Unimin, New Canaan, CT |
|  | HYPDX RF 1341 | epoxy-modified, carboxyl-terminated, butadiene-nitrile rubber | CVC Chemical, Moorestown, NJ |
|  | KELPOXY G293-100 | epoxy-modified, carboxyl-terminated, butadiene-nitrile rubber | Reichhold |
|  | K-54 | 2,4,6 - tri(dimethylaminomethyl)phenol | Air Products, Allentown, PA |
|  | R805 | octylsilane treated fumed silica | Evonik, Essen, DE |

* ew = equivalent weight in grams per mole of equivalents.

Base Component Preparation Method. Using the compositions summarized in Table 2, all materials were weighed into plastic cups that varied in size depending on the batch size. The materials were mixed at room temperature in a DAC 600 FVZ SPEEDMIXER (Hauschild Engineering, Hamm, Germany) for one to two minutes at 2350-3000 rpm to prepare the base component.

syringe at approximately 30 g per addition. The exotherm that occurred after each epoxy resin addition was allowed to subside such that the temperature of the mixture returned to 71° C. Additional epoxy resin was added when the temperature had returned to 71° C. This process was repeated until the desired amount of epoxy resin had been added. The temperature of amine/epoxy mixture was then raised to 82° C., the

TABLE 2

Base Component Compositions (reported in wt. %).

| | I.D. | B-1 | B-2 | B-3 | B-4 | B-5 | B-6 | B-7 | B-8 | B-9 | B-10 | B-11 | REF-B |
|---|---|---|---|---|---|---|---|---|---|---|---|---|---|
| a1 | MX-257 | 34.2 | 32.6 | 33.2 | 33.5 | 34.5 | — | — | — | — | — | 33.2 | 26.8 |
| | MX-267 | — | — | — | — | — | 28.2 | 27.8 | 28.8 | 26.8 | 31.0 | — | — |
| | YL 980 | — | — | 16.2 | — | — | — | — | — | — | 15.8 | — | 30.0 |
| | EPON 828 | — | — | — | — | — | — | — | — | — | — | — | 10.6 |
| | EPON 834 | — | — | — | — | — | — | — | — | 13.7 | — | — | — |
| a2 | AER 4152 | 16.7 | — | 16.2 | 16.4 | 16.9 | 14.4 | 14.1 | 14.6 | — | 15.8 | 16.2 | — |
| a3 | 509S | 16.7 | 15.9 | — | 16.3 | 16.9 | — | — | — | — | — | 16.2 | — |
| | ERISYS GE21 | — | — | — | — | — | 14.4 | 14.1 | 14.6 | 13.7 | — | — | — |
| b | — | | | | | | | | | | | | |
| c | — | | | | | | | | | | | | |
| d | XM B301 | 13.2 | 12.6 | 12.8 | 25.9 | — | 10.5 | 20.7 | — | 10.0 | 11.5 | 8.4 | 22.8 |
| e | — | | | | | | | | | | | | |
| f | MCURE 201 | 13.2 | 12.6 | 12.8 | — | 26.7 | 10.5 | — | 21.4 | 10.0 | 11.5 | 17.2 | — |
| Other | Z-6040 | 1.0 | 1.0 | 1.0 | 1.0 | 1.1 | 0.9 | 0.9 | 0.9 | 0.9 | 0.9 | 1.0 | 0.7 |
| | ASP 600 | 3.5 | 8 | 6.3 | 5.4 | 2.6 | — | — | — | — | — | 5.8 | — |
| | SYLOTHIX 52 | 1.5 | 1.5 | 1.5 | 1.5 | 1.5 | 1.5 | 1.5 | 1.5 | 1.5 | 1.5 | 2.0 | — |
| | MINEX 4 or 7 | — | — | — | — | — | 19.6 | 20.9 | 18.1 | 23.5 | 12.0 | — | 8.2 |
| | R805 | — | — | — | — | — | — | — | — | — | — | — | 0.9 |

Accelerator Component Preparation Method. Accelerator components were prepared according to the compositions summarized in Table 3. The ACAMINE 1922A, and 2678 amines were weighed into a 0.5 liter can. This mixture was stirred at 350 rpm with an overhead stir motor and impellor blade under a nitrogen stream while heated to 71° C. on a hot plate. The epoxy resins were added in multiple charges via a CaOTf was added, and the mixing speed was increased to 750 rpm. After 30 minutes, the temperature was reduced to 71° C. Upon reaching this temperature, the ANCAMINE K-54 was added, and the accelerator composition was stirred for an additional 5-10 minutes. If any fillers were used in the accelerator composition, these materials were added and mixed in using the DAC 600 FVZ SPEEDMIXER as described above for the base resins.

TABLE 3

Accelerator Component Compositions (reported in wt. %).

| | I.D. | A-1 | A-2 | A-3 | A-4 | A-5 | A-6 | A-7 | A-8 | A-9 | REF-A |
|---|---|---|---|---|---|---|---|---|---|---|---|
| a1 | EPON 828 | 5.6 | 6.1 | 5.8 | 5.7 | 5.4 | 5.3 | 5.2 | 4.9 | 5.7 | 12.6 |
| a2 | — | | | | | | | | | | |
| a3 | — | | | | | | | | | | |
| b | ANCAMINE 1922A | 49.1 | 54.2 | 51.6 | 50.8 | 47.6 | 55.0 | 53.8 | 50.8 | 50.7 | 32.5 |
| c | ANCAMINE 2678 | 7.3 | 8.0 | 7.6 | 7.5 | 7.0 | 8.4 | 8.2 | 7.8 | 7.5 | 21.7 |
| d | — | | | | | | | | | | |
| e | CaOTf | 2.3 | 2.6 | 2.4 | 2.4 | 2.3 | 2.5 | 2.5 | 2.3 | 2.4 | 2.8 |
| f | — | | | | | | | | | | |
| Other | HYPOX RF 1341 or KELPOXY G293-100 | 17.0 | 18.8 | 17.9 | 17.6 | 16.5 | 2.2 | 2.2 | 20.8 | 17.6 | 21.8 |
| | K-54 | 5.7 | 6.3 | 6.0 | 5.9 | 5.6 | 5.1 | 5.0 | 4.7 | 4.8 | 3.6 |
| | ASP 600 | 11.4 | 2.4 | 7.0 | 8.4 | 14.0 | — | — | — | 7.2 | — |
| | SYLOTHIX 52 | 1.6 | 1.6 | 1.6 | 1.6 | 1.6 | 1.2 | 1.4 | 1.4 | 4.0 | — |
| | MINEX 4 or 7 | — | — | — | — | — | — | 1.8 | 8.4 | — | 4.0 |
| | R805 | — | — | — | — | — | — | — | — | — | 1.0 |

Resin/Substrate Affinity. Plastic coupons measuring 10.2 by 2.5 by 0.3 cm were cleaned with isopropyl alcohol. The plastic coupon substrate materials are defined in Table 4. A small amount of epoxy-based reactive diluent was placed onto the surface of each plastic coupon, 76-127 micrometer (3-5 mil) spacer beads were sprinkled onto the diluent, and an 18 mm diameter microscope slide coverslip was placed onto the diluent and pressed against the substrate. The resin was left in contact with the plastic coupon for 5 to 6.5 hours. The coverslip was then removed, and the coupon was wiped with isopropyl alcohol and visually inspected. A 'pass' was recorded when the resin clearly dissolved or swelled the plastic coupon, either leaving an indentation or raised bump on the substrate. A 'fail' was recorded if there was no mark or only slight hazing of the substrate, with no evidence of dissolution or swelling. The results are shown in Table 5.

TABLE 4

Substrate Materials.

| I.D. | Material | Description | Source |
|---|---|---|---|
| PC1 | LEXAN | polycarbonate resin thermoplastic | SABIC |
| PC2 | EMERGE 8600 | polycarbonate resin thermoplastic | Dow Chemical Co. |
| ABS | ABS NATURAL | acrylonitrile-butadiene-styrene | Plastic Intl, Eden Prairie, MN |
| PC/ABS | CYCOLOY 6600 | Acrylonitrile-butadiene-styrene and polycarbonate plastic | SABIC |

TABLE 5

Substrate Affinity of Epoxy-Based Reactive Diluent.

| Epoxy-Based Reactive Diluent | Solubility Parameter (Diluent) (J/cm) | Viscosity (cps) | PC1 | PC2 | ABS | PC/ABS |
|---|---|---|---|---|---|---|
| EP 509S | 20.03 | 25 | Fail | Fail | Fail | Pass |
| ERISYS GE21 | 19.56 | 15 | Pass | Pass | Pass | Pass |

Two-Part Dispenser. The base resin and the accelerator components were degassed under vacuum at room temperature while mixing. The materials were then loaded into 2:1 DUO-PAK syringes (available from Wilcorp Corporation). The ratio was 2 parts by weight base component to 1 part by weight accelerator component, yielding a 2:1 ratio of epoxy equivalents to amine equivalents. Samples were degassed by placing the syringes in an oven at 70° C. for 15 to 20 minutes. After being removed from the oven and allowed to cool to room temperature, resin was dispensed until a bubble free, even flow from both sides of the cartridge was observed. A static mixing tip was then attached to the outlet of the syringe and used to dispense the adhesives for curing and bonding.

Experiment 1

Examples 1-2 (EX-1 and EX-2), Comparative Examples 1-3 (CE-1 Through CE-3)

Various combinations of the base epoxy and amine accelerators were placed into Duo-Pak syringes. These were tested for gel point using the ARES rheometer. The same adhesives were used to prepare overlap shear samples for testing on PC2 and PC/ABS substrates. The results are shown in Table 6.

TABLE 6

| Ex. | Base (2 pbw) | Accel. (1 pbw) | a1 | a2 | a3 | b | c | d | e | f | Other | Gel Time (min) | Overlap Shear (MPa) PC2 | Overlap Shear (MPa) PC/ABS |
|---|---|---|---|---|---|---|---|---|---|---|---|---|---|---|
| EX-1 | B-1 | A-1 | 24.7 | 11.1 | 11.1 | 16.4 | 2.4 | 8.8 | 0.8 | 8.8 | | 15.9 | 12.7 | 3.6 | SF |
| EX-2 | B-3 | A-3 | 34.8 | 10.8 | — | 17.2 | 2.5 | 8.5 | 0.8 | 8.5 | | 16.9 | 13.4 | SF | SF |
| CE-1 | B-2 | A-2 | 23.7 | — | 10.6 | 18.1 | 2.7 | 8.4 | 0.9 | 8.4 | | 27.2 | 14.2 | 3.3 | 5.0 |
| CE-2 | B-4 | A-4 | 24.2 | 10.9 | 10.9 | 16.9 | 2.5 | 17.3 | 0.8 | — | | 16.5 | 12.5 | 3.5 | 4.6 |
| CE-3 | B-5 | A-5 | 24.8 | 11.3 | 11.3 | 15.9 | 2.3 | — | 0.8 | 17.8 | | 15.8 | 28.9 | SF | 6.1 |

SF = substrate failure

Table 6 shows the accelerating effect the combination of the acetoacetoxy functionalized compound (AcAc), CaOTf, and amine functionality on the gel time for the amine cured epoxy adhesive. This shows that using the multifunctional acrylate without the AcAc component results in the slowest gel time. Table 6 also shows that adhesion to plastics is diminished in samples without the polyurethane epoxy or the multifunctional acrylate. Comparative Example 3 (CE-3) illustrates that good adhesion to plastics can be obtained without the AcAc component, but the gel time is increased. Example 1 (EX-1) illustrates that diluents can be used, especially if they show a strong affinity for the plastic being bonded (see Table 5, above).

Experiment 2

Example 3 (EX-3), Comparative Examples 4-6 (CE-4 Through CE-6), and Reference Example 1 (REF-1)

Bonding can be more challenging on certain plastic substrates, for example, on pure ABS and PC1. In such cases, it is beneficial to add the epoxy-based reactive diluent to achieve better bonding. Various combinations of the base epoxy and amine accelerators were tested for gel point using the ARES rheometer and to prepare overlap shear samples on PC1 and pure ABS. The results are shown in Table 7. A comparison of the gel times of the compositions shown in Table 6 (EX-1, EX-2, and CE-1) with the gel times of the compositions shown in Table 7 (EX-3, CE-6, and REF-1) shows that a greater total amount of AcAc and acrylate in the compositions of table 6 results in faster gel times. When lower amounts of amine are used, the corresponding gel time is longer.

TABLE 7

| Ex. | Base (2 pbw) | Accel. (1 pbw) | a1 | a2 | a3 | b | c | d | e | f | Other | Gel Time (min) | Overlap Shear (MPa) PC1 | Overlap Shear (MPa) ABS |
|---|---|---|---|---|---|---|---|---|---|---|---|---|---|---|
| EX-3 | B-6 | A-6 | 20.6 | 9.6 | 9.6 | 18.3 | 2.8 | 7.0 | 0.8 | 7.0 | 38.3 | 22.8 | 6.0 | 6.3 |
| CE-4 | B-7 | A-6 | 20.3 | 9.4 | 9.4 | 18.3 | 2.8 | 13.8 | 0.8 | — | 25.2 | 20.8 | 4.7 | 5.5 |
| CE-5 | B-8 | A-7 | 20.9 | 9.7 | 9.7 | 17.9 | 2.7 | — | 0.8 | 14.3 | 24.0 | 26.1 | 4.9 | 5.4 |
| CE-6 | B-9 | A-6 | 28.8 | — | 9.1 | 18.3 | 2.8 | 6.7 | 0.8 | 6.7 | 26.8 | 23.4 | 6.3 | 3.5 |
| REF-1 | B-10 | A-8 | 26.1 | 10.5 | — | 16.9 | 2.6 | 7.7 | 0.8 | 7.7 | 27.7 | 25.3 | 3.5 | 2.8 |

Experiment 3

Example 4 (EX-4) and Reference Example 2 (REF-2)

The gel time of EX-4 was tested by dispensing 10 g of material into a plastic Petri dish from a 2:1 cartridge with a static mixing tip. A wooden dowel was used to occasionally stir the material to determine when it had gelled. As shown in Table 8, the sample gelled in 7 minutes.

REF-2 (a fast-cure epoxy adhesive available under the trade name DP 405 from 3M) and EX-4 were used to prepare overlap shear tests on PC2 and PC/ABS substrates.

TABLE 8

| Ex. | Base (2 pbw) | Accel. (1 pbw) | a1 | a2 | a3 | b | c | d | e | f | Other | Overlap Shear (MPa) PC2 | Overlap Shear (MPa) PC/ABS |
|---|---|---|---|---|---|---|---|---|---|---|---|---|---|
| EX-4 | B-11 | A-9 | 24.1 | 10.8 | 10.8 | 16.9 | 2.5 | 5.6 | 0.8 | 11.5 | 17.0 | 9.23 (SF) | 9.36 (SF) |
| REF-2 | REF-B | REF-A | 49.2 | — | — | 10.8 | 7.2 | 15.2 | 0.9 | — | 16.7 | 2.90 | 3.43 |

SF = Substrate Failure

Six 10.2 by 2.5 cm aluminum coupons were bonded with the adhesives of EX-4 using a 1.3 cm overlap and 76-127 micrometer (3-5 mil) spacer beads to control the bond line thickness. The overlap shear strength was measured at periodic intervals from the time the bonds were made according to the Rate of Strength Buildup Test Method. The results of the Rate of Strength Buildup Test are shown in Table 9.

TABLE 9

Rate of strength build-up.

| Time (min) | Shear Strength (MPa) |
|---|---|
| 10 | 0.007 |
| 15 | 0.02 |
| 20 | 0.29 |
| 25 | 0.3 |
| 30 | 0.34 |

Table 9 shows that, in some embodiments, adhesive compositions of the present disclosure can achieve a handling strength in overlap shear of about 0.3 MPA in 20 minutes, and 0.34 MPa in 30 minutes.

Additional Properties. To determine tip life, EX-4 was also dispensed from the cartridge at 5 and 10 minutes following initial dispensing. The material was able to be dispensed successfully, without plugging the tip, after 10 minutes from initial dispensing.

Various modifications and alterations of this invention will become apparent to those skilled in the art without departing from the scope and spirit of this invention.

What is claimed is:

1. An adhesive comprising:
   (a) an epoxy resin component comprising:
      (a1) a first epoxy resin, and
      (a2) a second epoxy resin, wherein the second epoxy resin is selected from the group consisting of a polyurethane-modified epoxy resin, an isocyanate-modified epoxy resin, and combinations thereof;
   (b) a first amine curing agent having a high amine equivalent weight of at least 50 grams per mole of amine equivalents;
   (c) a second amine curing agent having a low amine equivalent weight of no greater than 45 grams per mole of amine equivalents;
   (d) an acetoacetoxy-functionalized compound;
   (e) a metal salt catalyst; and
   (f) a multifunctional acrylate.

2. The adhesive of claim 1, wherein the epoxy resin component further comprises:
   (a3) a third epoxy resin, wherein the third epoxy resin comprises at least one epoxy-based reactive diluent.

3. The adhesive according to claim 2, wherein the third epoxy resin shows a high affinity for one or more plastic substrates selected from the group comprising polycarbonate, acrylonitrile-butadiene-styrene, or combinations thereof, as determined by swelling or dissolution of the plastic substrate left in contact with the third epoxy resin for an amount of time equal to or less than 6.5 hours.

4. The adhesive according to claim 1, wherein the amount of the multifunctional acrylate and the acetoacetoxy-functionalized compound together comprises at least 11 wt. % of the adhesive.

5. The adhesive according to claim 1, wherein the ratio of the multifunctional acrylate to the acetoacetoxy-functionalized compound ranges from 80 parts by weight multifunctional acrylate: 20 parts by weight acetoacetoxy-functionalized compound to 20 parts by weight multifunctional acrylate:80 parts by weight acetoacetoxy-functionalized compound.

6. The adhesive according to claim 1, wherein the first epoxy resin comprises a polyglycidyl ether of bisphenol-A, bisphenol-F, or novolac.

7. The adhesive according to claim 1, wherein at least one of the amine curing agents has the general formula

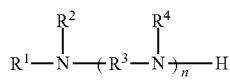

wherein,
R1, R2, and R4, are independently selected from hydrogen, a hydrocarbon containing 1 to 15 carbon atoms, and a polyether containing 1 to 15 carbon atoms;
R3 represents a hydrocarbon containing 1 to 4-15 carbon atoms or a polyether containing 1 to 15 carbon atoms; and
n is from 1 to 10, inclusive.

8. The adhesive according to claim 1, wherein the relative amounts of low equivalent weight amine curing agent and high equivalent weight amine curing agent are selected such that the low equivalent weight amine curing agent comprises at least 25 wt. % of the combined weight of the low and high equivalent weight amine curing agents.

9. The adhesive according to claim 1, wherein the relative amounts of low equivalent weight amine curing agent and high equivalent weight amine curing agent are selected such that the low equivalent weight amine curing agent comprises between 30 and 60 wt. %, inclusive, of the combined weight of the low and high equivalent weight amine curing agents.

10. The adhesive according to claim 1, wherein the acetoacetoxy-functionalized compound has the general formula of:

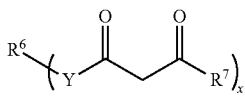

wherein,
x is an integer from 1 to 10;
Y represents O, S or NH;
R6 is selected from the group consisting of polyoxy groups, polyester-alkyls, -aryls, and -alkylaryls, and linear, branched, saturated, and unsaturated alkyl-, aryl-, and alkylaryl-groups; wherein R6 is linked to Y via a carbon atom; and
R7 is a linear or branched or cyclic alkyl having 1 to 12 carbon atoms.

11. The adhesive according to claim 1, wherein the metal salt catalyst comprises calcium triflate.

12. The adhesive according to claim 1, wherein the adhesive comprises 0.3 to 1.5 wt. % catalyst, based on the total weight of the composition.

13. The adhesive according to claim 1, wherein the adhesive comprises two components, wherein:
(a) the first component comprises:
(i) the acetoacetoxy-functionalized compound,
(ii) the multifunctionalized acrylate, and
(iii) at least a portion of the epoxy resin component; and
(b) the second component comprises:
(i) the first amine curing agent,
(ii) the second amine curing agent, and
(iii) the metal salt catalyst.

14. The adhesive of claim 13, wherein the second component further comprises a portion of the epoxy resin component.

15. The adhesive of claim 13, wherein the first component further comprises the third epoxy resin comprising the at least one epoxy-based reactive diluent.

16. The adhesive of claim 13, wherein the adhesive comprises greater than 16 wt. % of acetoacetoxy-functionalized compound based on the total weight of the first component.

17. The adhesive according to claim 1, wherein the adhesive has a gel time at 25° C. of no greater than 20 minutes measured according to the Gel Time Test Method.

18. The adhesive according to claim 1, wherein when cured at 22° C., the adhesive has an overlap shear value of at least 0.3 MPa after no greater than 20 minutes, as measured according to the Rate of Strength Buildup Test Method.

19. The adhesive according to claim 17, wherein when cured at 22° C., the adhesive has an overlap shear value of at least 0.34 MPa after no greater than 30 minutes, as measured according to the Rate of Strength Buildup Test Method.

20. An adhesive dispenser comprising a first chamber containing a first component of a two-part adhesive, a second chamber containing a second component of the two-part adhesive, and a mixing tip, wherein the first and second chambers are coupled to the mixing tip to allow the first component and the second component to flow through the mixing tip; and wherein the first component comprises an epoxy resin, a polyurethane-modified or isocyanate-modified epoxy resin, a multifunctional acrylate, and an acetoacetoxy-functionalized compound, and the second component comprises a first amine curing agent having an amine equivalent weight of at least 50 grams per mole of amine equivalents; a second amine curing agent having an amine equivalent weight of no greater than 45 grams per mole of amine equivalents, and a metal salt catalyst.

* * * * *